United States Patent
Virtanen et al.

(10) Patent No.: US 7,539,160 B2
(45) Date of Patent: May 26, 2009

(54) METHOD AND SYSTEM FOR CONTROLLING ACCESS BEARER IN A REAL-TIME DATA SERVICE

(75) Inventors: Terhi Tuulikki Virtanen, Oulu (FI); Pekka Marjelund, Muijala (FI); Petri J. Vuorinen, Espoo (FI); Jukka K. Jaakkola, Oulu (FI)

(73) Assignee: Nokia Corporation, Espoo (FI)

( * ) Notice: Subject to any disclaimer, the term of this patent is extended or adjusted under 35 U.S.C. 154(b) by 724 days.

(21) Appl. No.: 10/827,681

(22) Filed: Apr. 20, 2004

(65) Prior Publication Data

US 2005/0141471 A1  Jun. 30, 2005

(30) Foreign Application Priority Data

Dec. 29, 2003 (FI) ................................ 20031911

(51) Int. Cl.
*H04W 4/00* (2009.01)
*H04W 72/00* (2009.01)

(52) U.S. Cl. ........................ 370/329; 455/450; 455/451; 455/452.1; 455/452.2; 455/453; 370/330; 370/341; 370/235

(58) Field of Classification Search ................ 455/574, 455/511, 450–453; 370/352, 433, 329, 330, 370/341, 348, 235; *H04B 7/00; H04Q 7/20; H04L 12/66*
See application file for complete search history.

(56) References Cited

U.S. PATENT DOCUMENTS

| | | | |
|---|---|---|---|
| 6,374,112 B1 * | 4/2002 | Widegren et al. | 455/452.2 |
| 6,507,567 B1 | 1/2003 | Willars | |
| 6,594,241 B1 | 7/2003 | Malmöf | |
| 6,640,105 B1 * | 10/2003 | Shin | 455/453 |
| 2002/0094833 A1 * | 7/2002 | Lieshout et al. | 455/522 |
| 2002/0150091 A1 | 10/2002 | Lopponen et al. | 370/389 |
| 2002/0150092 A1 | 10/2002 | Bontempi et al. | 370/389 |
| 2002/0173327 A1 * | 11/2002 | Rosen et al. | 455/518 |
| 2003/0012217 A1 * | 1/2003 | Andersson et al. | 370/437 |
| 2003/0096619 A1 | 5/2003 | Winberg | |
| 2003/0108027 A1 * | 6/2003 | Kim et al. | 370/345 |
| 2003/0223381 A1 | 12/2003 | Schroderus | 370/285 |

FOREIGN PATENT DOCUMENTS

| | | |
|---|---|---|
| EP | 1 398 988 A1 | 3/2004 |
| WO | WO 02/39775 A1 | 5/2002 |
| WO | WO 02/085051 A1 | 10/2002 |

OTHER PUBLICATIONS

Radio Resource Control (RRC) protocol specification (3GPP TS 25.331 version 5.4.0 Release 5), p. 231.*

* cited by examiner

*Primary Examiner*—Lester Kincaid
*Assistant Examiner*—Daniel Lai
(74) *Attorney, Agent, or Firm*—Squire, Sanders & Dempsey, LLP

(57) ABSTRACT

A radio access network (RNC) assigns for a real-time media session a real-time access bearer that can be shifted between a dedicated channel state and a common channel state. The assignment is made in response to receiving an access bearer assignment message indicating that the real-time media session requires a real-time access bearer of that type. The media activity of the real-time access bearer is then monitored, and the access bearer shifts to the common channel state upon detecting media inactivity during the dedicated channel state, and shifts to the dedicated channel state upon detecting media activity during the common channel state.

30 Claims, 4 Drawing Sheets

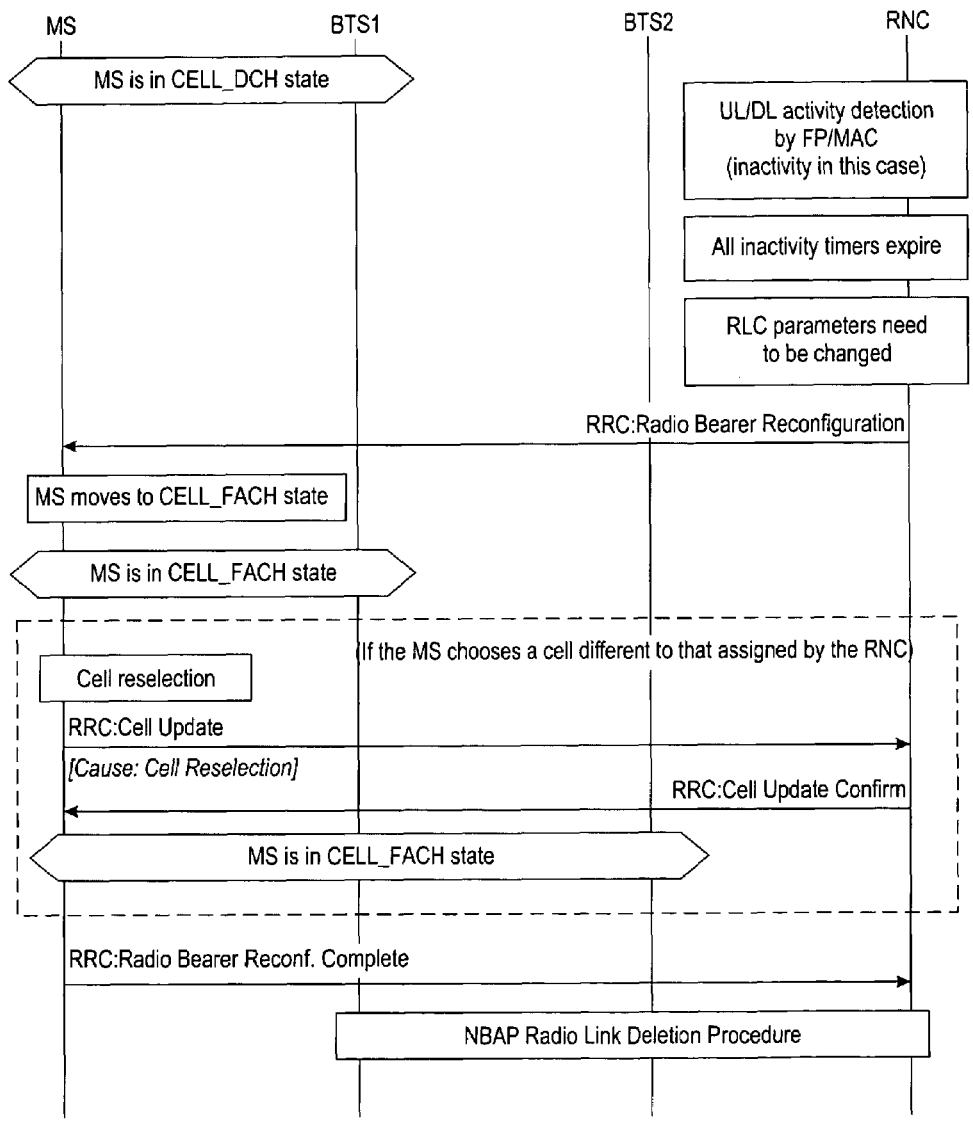

METHOD AND SYSTEM FOR CONTROLLING ACCESS BEARER IN A REAL-TIME DATA SERVICE

FIELD OF THE INVENTION

The present invention relates to real-time communications services in communication systems.

BACKGROUND OF THE INVENTION

Particularly in the third generation (3G) mobile communications systems, a public land mobile network (PLMN) infrastructure may be logically divided into a core network (CN) and an access network (AN) infrastructures, as illustrated in FIG. 1. The access network AN may be called a base station subsystem (BSS) for GSM and a radio network subsystem (RNS) or a radio access network (RAN) for UMTS. In the technical specifications of a third generation partnership project (3GPP), the core network CN is logically divided into a circuit switched (CS) domain, a packet switched (PS) domain and an IP multimedia subsystem (IMS). The CS domain refers to a set of all the CN entities offering "CS type of connection" for user traffic as well as to all the entities supporting the related signaling. A "CS type of connection" is a connection for which dedicated network resources are allocated at the connection establishment and released at the connection release. A "PS type of connection" transports the user information using packets so that each packet can be routed independently of the previous one. An example of the PS domain is the GPRS (General Packet Radio Service), and the typical entities may include a serving GPRS support node (SGSN) and a gateway GPRS support node (GGSN). The IP multimedia subsystem comprises all CN elements for provision of multimedia services. The IP multimedia subsystem IMS utilizes the PS domain to transport multimedia signaling and bearer traffic.

Push-to-talk over Cellular (PoC) is an overlay speech service in a mobile cellular network where a connection between two or more parties is established (typically) for a long period but the actual radio channels in the air interface are activated only when somebody is talking. This corresponds to the usage of the traditional radio-telephones where the radio frequency used is agreed on between the parties (e.g. military/police radios, LA radios) or permanently set (walkie-talkie type of radios), and whenever someone wishes to talk, s/he presses the tangent which activates the radio transmission in the selected channel. The traditional radiotelephone services are simplex by nature so that only one party (the one who is pressing the tangent) can talk at a time. More specifically, in a voice communication with a "push-to-talk, release-to-listen" feature, a call is based on the use of a pressel (PTT, push-to-talk switch) in a telephone as a switch: by pressing a PTT the user indicates his desire to speak, and the user equipment sends a service request to the network. Alternatively, a voice activity detector (VAD) or any suitable means can be used instead of the manual switch. The network either rejects the request or allocates the requested resources on the basis of predetermined criteria, such as the availability of resources, priority of the requesting user, etc. At the same time, a connection is established also to a receiving user, or users in the case of group communication. After the voice connection has been established, the requesting user may talk and the other users may listen. When the user releases the PTT, the event is detected in the network, and the resources are released and/or a speech item is granted to another user. Thus, the resources are reserved only for the actual speech transaction or speech item, instead of reserving the resources for a "call".

Modern cellular networks, especially in the GSM/GPRS/UMTS network evolution, include new packet-mode (e.g. TP) voice and data services. A Push-to-talk over Cellular (PoC) service can be provided as a packet-based user or application level service so that the underlying communications system only provides the basic connections (i.e. IP connections) between the group communications applications in the user terminals and the group communication service. The PoC communication service can be provided by a communication server system while the client applications reside in the user equipment or terminals. Examples of this approach are disclosed in co-pending U.S. patent applications Ser. Nos. 09/835,867; 09/903,871; and 10/160,272; and in WO 02/085051.

With the PoC service, first the connection(s) between the parties is established typically via the packet switched (PS) mobile network, e.g. a packet switched (PS) core network. In practice, this means that a Voice over IP (VoIP; group or one-to-one) call is set up between the parties. However, as described above, the difference from a conventional phone call is that the radio channel of the subscribers is activated only when someone needs to talk and released when no one is talking.

The PoC service is a practical solution for cases wherein the parties need to talk relatively rarely but whenever someone needs to talk, the connection has to be activated fast and easily (e.g. when giving instructions to the members of a hunting team in the forest or to a crane driver on a construction site). Because in this type of applications the calls are typically long but the voice activity is low, it is essential to release the bearer (e.g. radio channels) while no one is talking in order to save the radio and network capacity and terminal batteries. On the other hand, the bearer resources should be available with as small a delay as possible when the voice activity starts again.

DISCLOSURE OF THE INVENTION

An object of the invention is to provide a method for controlling access bearer resources in a real-time media communication with inactive and active periods.

The object is achieved by the invention defined in the attached independent claims. Preferred embodiments of the invention are defined in the sub claims.

According to a first aspect of the present invention, an access network assigns for a real-time media session a real-time access bearer that can shift between a dedicated channel state and a common channel state. The assignment is preferably carried out in response to receiving an access bearer assignment message indicating that the real-time media session requires a real-time access bearer of that type. The media activity of the real-time access bearer is then monitored, and the access bearer is shifted to the common channel state upon detecting media inactivity during the dedicated channel state, and shifted to the dedicated channel state upon detecting media activity during the common channel state.

Some of the advantages of the present invention are illustrated by means of an example wherein the invention is applied to packet-mode communication of push-to-talk type, such as the PoC in a WCDMA environment. In accordance with the basic principles of the invention, the user equipment can be kept in a connected mode (the real-time bearer assigned) during a PoC call but is shifted to a common channel (such as CELL_FACH, CELL_PCH or URA_PCH) state during voice inactivity. When someone starts to talk, s/he presses a push-to-talk tangent and her/his user equipment starts the transmission. As a consequence, e.g. via normal packet call reservation mechanisms, the user equipment is shifted to the dedicated channel state (e.g. CELL_DCH state) with a dedicated channel for speech transmission so that communication between the parties is possible. When the talking stops (none of the parties is transmitting any more), the dedicated channel is released and the user equipment is shifted back to a common channel state. When the user equipment is in the common channel state during the voice inactivity, the radio, base station radio or transmission capacity is not consumed. Also, the terminal battery is saved because nothing is transmitted or received. A state transition from a common channel state to a dedicated channel state may take a few hundred milliseconds, which is expected to be fast enough for smooth operation of the PoC service. Thus, a fast activation time of the radio connections after pushing the tangent button is achieved, which improves the total QoS of the PoC service. The activation of the radio connections only requires radio resource control (RRC) signaling between the terminal and the access network. No signaling between the terminal and the core network is needed. Only small modifications to the existing functionality of 3G terminals and network are needed due to the invention. Some memory capacity in the network is consumed, however, due to preserving the RRC connection in the radio access network and the packet data protocol context in the core network during the inactive periods.

The assignment of the new type of real-time access bearer is preferably made in response to receiving an access bearer assignment message indicating that the real-time media session requires a real-time access bearer of that type. Otherwise, the radio access network could not know which Radio Access Bearer (RAB) is used for the PoC service so that it could utilize the state transitions between dedicated channel and common channel states. During active speech sessions, the PoC requires a real-time connection having the characteristics of the streaming or conversational traffic class RAB. On the other hand, during voice inactivity the real-time connection has to be freed and the transition time from voice inactivity to voice activity does not need to fulfill the strict delay requirements of the real-time data transmission, which is not a preferred operation of the conventional real-time services. The new indication according to the invention enables the access network to distinguish between the conventional real-time access bearers and the novel real-time access bearers.

BRIEF DESCRIPTION OF THE DRAWINGS

The above and other objects, features and advantages of the present invention will become more apparent in the light of the following detailed description in conjunction with the drawings, in which FIG. 7 is a signaling diagram illustrating an example of a state transition from a dedicated channel state to a common channel state after inactivity detection.

DETAILED DESCRIPTION

The present invention is applicable to communications systems enabling real-time media sessions between end users. Real-time data may include real-time audio (e.g. speech), real-time video, or any other real-time data, or combination thereof, i.e. real-time multimedia.

The present invention is especially applicable to a communications system allowing packet-mode real-time data communication, such as IP packet communication between end users. Thus, real-time data communication may be carried out between end user terminals over the Internet, for example.

The present invention provides a significant improvement for packet-mode speech communications. Voice over Internet Protocol (VoIP) enables a speech communication over an IP connection. In some embodiments of the invention, the IP voice communication method employed is the Voice over IP (VoIP), but the invention is not limited to this particular method.

Figure 1:
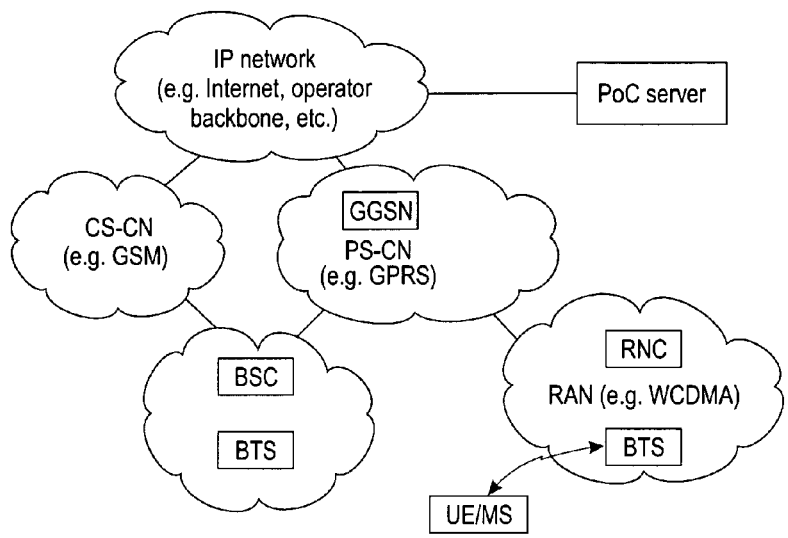
FIG. 1 illustrates a communication system having a radio access network RAN, CS and PS core networks, and a PoC server.

An example of a system environment to which the principles of the present invention may be applied will be described with reference to FIG. 1. In FIG. 1, a Push-to-talk over Cellular (PoC) server system is provided on top of a Packet Switched (PS) core network in order to provide packet mode (e.g. IP) voice, data and/or multimedia communication services to User Equipment (UE). UE accessing the PS CN, and the PS core network itself, utilize the services provided by a Radio access network (RAN) to provide packet-mode communication between the UE and the PS CN subsystem. The multiple access method employed in the air interface in the RAN may be Time Division Multiple Access (TDMA), Frequency Division Multiple Access (FDMA), Code Division Multiple Access (CDMA), or a combination thereof. In the $3^{rd}$ and higher generation mobile communications systems, the access method is primarily based on the CDMA. Further, because the traffic channels may have a wide bandwidth, corresponding to user data rates e.g. up to 2 Mbits/s, such access may also be referred to as a Wideband CDMA (WCDMA).

As to the PoC type services, examples of this concept are disclosed in co-pending U.S. patent applications Ser. Nos. 09/835,867; 09/903,871; 10/160,272; and in WO 02/085051. Conceptually, a packet based media communication system is provided on top of the mobile network in order to provide media communication services to the user equipment UE through the communication system. The media communication system may be embodied as a server system, and it is generally referred to as a media communication server herein. The media communication server may comprise control-plane functions CPF and user-plane functions providing packet mode server applications that communicate with the communication client application(s) in the user equipment UE over the IP connections provided by the communication system. This communication includes signaling packets and voice or data communication packets. The CPF function is responsible for control-plane management of the group communication. This may include, for example, managing the user activity and creation and deletion of logical user-plane connections with an appropriate control protocol, such as Session Initiation Protocol (SIP). The user-plane function(s)

UPF is/are responsible for distributing the data or speech packets to the user terminals according to their group memberships and other settings. The UPF forwards traffic only between valid connections programmed by the CPF. In the case of speech communication, it may be based on a voice over IP (VoIP) protocol, and/or Real-time Transport Protocol (RTP). It should be appreciated that the user-plane operation relating to the data or speech traffic is irrelevant to the present invention. However, the basic operation typically includes that all the data or speech packet traffic from a sending user is routed to the UPF, which then delivers the packet traffic to the receiving user(s).

The User equipment UE may be a wireless device, such as mobile user equipment, or it may be a device connected by a fixed connection, such as a dispatcher station. Herein, the term 'user equipment' and the corresponding acronym 'UE' are used for referring to any device or user equipment allowing the user to access network services.

As an exemplary embodiment, the user equipment UE, such as a Mobile Station MS, may have a PoC application on a user layer on top of the standard protocol stack used in the specific mobile communications system. An appropriate session control protocol, such as a Session Initiation Protocol (SIP), may be used for the PoC control-plane signaling. The voice communication may be based on IP communication (such as voice over IP, VoIP), and RTP (Real-time Transport Protocol, defined in RFC1889) may be employed to handle the voice packet (VoIP) delivery in the user plane. The SIP and RTP protocols employ the underlying Transmission Control Protocol (TCP), User Datagram Protocol (UDP) and IP protocols that further employ the physical layer resources, such as the radio resources. For example, the underlying connection in a mobile communication network may be based on a GPRS connection.

Figure 3:
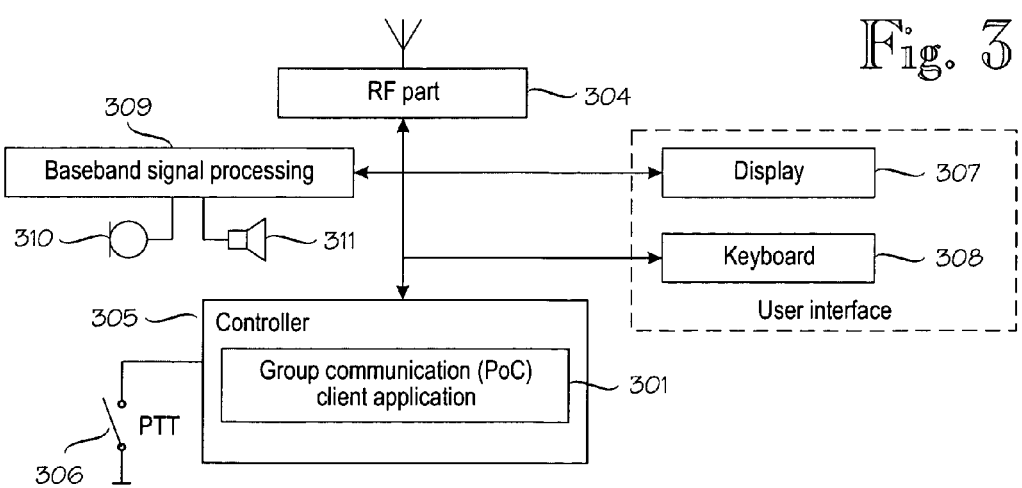
FIG. 3 is a block diagram illustrating basic blocks of user equipment according to an exemplary embodiment of the invention.

An example of a possible implementation of user equipment is illustrated in a simplified block diagram shown in FIG. 3. An RF part 304 represents any radio frequency function and hardware required by a specific air interface employed. The actual implementation of the RF part 304 is irrelevant to the present invention. Baseband signal processing 309 represents any baseband signal processing required in any specific implementation, such as an analog-digital (A/D) conversion of the analogue speech signal from a microphone 310, vo-encoding, IP packet building, frame building, deframing, IP packet debuilding, vo-decoding, a digital-analog (D/A) conversion of the received digital speech signal into an analog signal applied to a loudspeaker 311. A controller 305 controls the operation of the RF unit 304 and the baseband signal processing unit 309. The controller 305 controls the signaling, both outband (SIP) and embedded, as well as IP packet building and debuilding. The start and stop of the speech items are set by a PTT switch 306, which can be replaced by any user-operated device, e.g. a voice activity detector (VAD). Such alternative mechanisms for starting and ending a speech item instead of the PTT are obvious to a person skilled in the art. A user interface may include a display 307 and a keyboard 308. It should be appreciated that the blocks illustrated in FIG. 3 are functional blocks that can be implemented in a variety of different circuit configurations. For example, the baseband processing and the controller may be implemented in a single programmable unit (e.g. a CPU or a signal processor) or in a plurality of units. The operation according to the present invention is primarily related to the controller part of the MS, and the basic invention may be implemented as program modifications in the control program of the MS, for example. It should also be appreciated that the present invention is not intended to be restricted to mobile stations and mobile systems but the terminal can be any terminal having a speech communication capability. For example, the user terminal may be a terminal (such as a personal computer PC) having Internet access and a VoIP capability for voice communication over the Internet.

In the embodiment of FIG. 3, the controller 305 comprises a media communication client application 301 (e.g. PoC client). The media communication client application 301 (e.g. PoC client) provides the respective communication service. For example, in the case of PoC group communication, the client application 301 may maintain group information, such as group identification information and group membership information. The communication client 301 may also provide tools for group creation, for attaching to Joining) a group and for detaching from (leaving) the group, starting and ending the speech items, etc.

In PS core networks based on the GPRS or the like, the UE a) performs a GPRS attach procedure, and b) establishes a PDP context (i.e. a bearer) used for SIP signaling. This PDP context remains active throughout the period the UE is connected to the PS CN, i.e. from the initial registration and at least until deregistration. As a result, the PDP context provides the UE with information that makes the UE capable of constructing an IP address. During the establishment of a session, the UE establishes data stream(s) for media related to the session. Such a data stream(s) may result in activation of an additional PDP context(s), i.e. bearers. Such an additional PDP context(s) is/are established as secondary PDP contexts associated to the PDP context used for signaling. In other core network environments, other type of bearers may be used. It should be appreciated that the basic invention is basically independent of the type of the core network.

It should be appreciated that there are many applications of the Internet world that require the creation and management of a session, where a session is considered as an exchange of data between an association of participants. The implementation of these applications is complicated by the practices of the participants: users may move between endpoints, they may be addressable by multiple names, and they may communicate in several different media—sometimes simultaneously. Therefore, the present invention is not restricted to PoC services but can be applied to media flow management of such other applications as well.

Numerous protocols have been authored that carry various forms of real-time multimedia session data, such as voice, video, or text messages. The Session Initiation Protocol (SIP, RFC 3261) is a general-purpose tool for creating, modifying, and terminating sessions that works independently of underlying transport protocols and without dependency on the type of session being established. SIP can be used with other IETF protocols to build up a complete multimedia architecture. Typically, these architectures include protocols such as a Real-time Transport Protocol (RTP) (RFC 1889) for transporting real-time data and providing QoS feedback, a Real-Time streaming protocol (RTSP) (RFC 2326) for controlling delivery of streaming media, a Media Gateway Control Protocol (MEGACO) (RFC 3015) for controlling gateways to a Public Switched Telephone Network (PSTN), and a Session Description Protocol (SDP) (RFC 2327) for describing multimedia sessions.

It should be appreciated that VoIP or PoC are only examples of real-time media to which the present invention can be applied. It should also be appreciated that the type of media session set up on the application level or the protocols used for controlling the media session on that level are irrelevant to the basic invention. The present invention primarily relates to controlling access bearers on the access network level, e.g. radio access bearers in the RAN.

In the following, exemplary embodiments of the present invention will be described using 3GPP RAN as an example of the access network.

Figure 2:
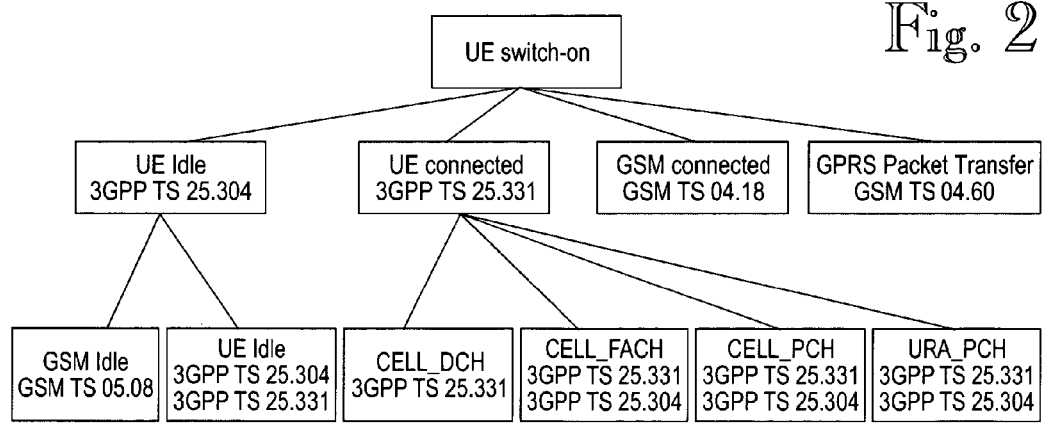
FIG. 2 illustrates various states of user equipment UE.

In the 3GPP radio access environment, the user equipment may adopt various protocol states. FIG. 2 summarizes the mapping of UE states, including states in GSM, to the appropriate 3GPP and GSM specifications that specify the UE behavior. These specifications are incorporated herein by reference. However, only UE connected, CELL_DCH, and CELL_FACH are of interest in the following exemplary embodiments of the invention.

After being switched on, the UE stays in Idle Mode until it transmits a request to establish an RRC (Radio Resource Control) Connection. In Idle Mode the connection of the UE is closed on all layers of the access stratum. In Idle Mode the UE is identified by non-access stratum identities, such as an International mobile subscriber identity (IMSI), Temporary mobile subscriber identity (TMSI) and Packet TMSI (P-TMSI). In addition, the RAN has no information of its own about the individual Idle Mode UEs, and it can only address e.g. all UEs in a cell or all UEs monitoring a paging occasion.

The RRC Connected Mode is entered when the RRC Connection is established. The UE is assigned a radio network temporary identity (RNTI) to be used as a UE identity on common transport channels. The transition to the RRC Connected Mode from the Idle Mode can only be initiated by the UE by transmitting a request for an RRC Connection. The event is triggered either by a paging request from the network or by a request from upper layers in the UE.

When the UE receives a message from the network that confirms the RRC connection establishment, the UE enters the CELL_FACH or CELL_DCH state of RRC Connected Mode. The RRC states within RRC Connected Mode reflect the level of UE connection and the transport channels that can be used by the UE.

In the CELL_DCH state, a dedicated physical channel is allocated to the UE on the uplink and downlink, the location of the UE being known on a cell level according to its current active set, and dedicated transport channels, shared transport channels, and a combination of these transport channels may be used by the UE.

The CELL_DCH-state is entered from the Idle Mode through the setup of an RRC connection, or by establishing a dedicated physical channel from the CELL_FACH state. A transition to CELL_FACH state occurs when all dedicated channels have been released via explicit signaling (e.g. Radio Bearer Reconfiguration, Radio Bearer Release, Radio Bearer Setup, Transport Channel Reconfiguration, etc.).

In the CELL_FACH state, no dedicated physical channel is allocated to the UE and the UE continuously monitors a FACH on the downlink. The RAN may know the position of the UE on a cell level, i.e. according to the cell where the UE last made a cell update.

A transition from CELL_FACH to CELL_DCH state occurs when a dedicated physical channel is established via explicit signaling (e.g. RADIO BEARER RECONFIGURATION, RADIO BEARER RELEASE, RADIO BEARER SETUP, TRANSPORT CHANNEL RECONFIGURATION, etc.).

Push-to-talk over Cellular (PoC) is a speech service in a mobile network where a connection between two or more parties is established (typically) for a long period but the actual radio channels in the air interface are activated only when someone is talking. With the PoC service, the connections between the parties are typically established via a packet switched mobile network. In practice this means that a Voice over IP (VoIP) (group) call is set up between the parties. However, the difference from a conventional phone call is that the radio channel of the subscribers is activated only when someone needs to talk, and released when no one is talking. In more general terms, there is a streaming type real-time media signal having a session of long duration but requiring access bearer resources only occasionally with fast set up times. There is a need for a method and means for controlling the activating and releasing the access beares so that fast set up time is achieved.

Figure 4:
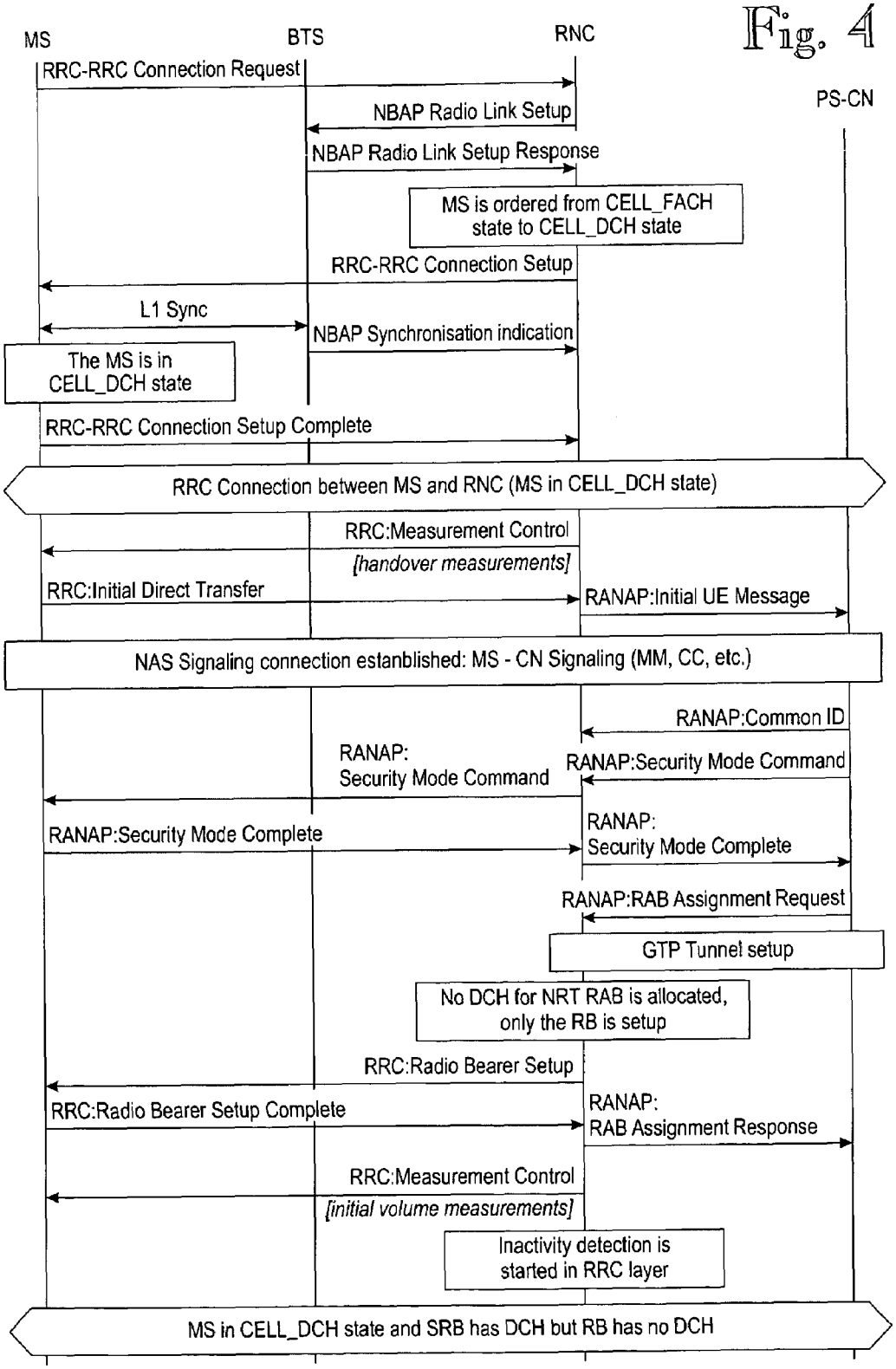
FIG. 4 is a signaling diagram illustrating an example of service establishment towards a PS core network in accordance with the present invention.

FIG. 4 shows a signaling diagram illustrating an example of establishing a real-time media service (e.g. a streaming signal, PoC, etc.) towards a packet switched core network (PS-CN) according to an embodiment of the present invention.

Initially, a mobile station (MS) or user equipment (UE) is in Idle Mode and then transmits a request to establish an RRC (Radio Resource Control) Connection to the RAN. The event is triggered either by a paging request from the network or by a request from upper layers in the UE, e.g. a PoC client application.

Upon receiving an RRC CONNECTION REQUEST message, a controlling entity, e.g. a radio network controller (RNC), in the RAN may either reject the request or accept the request. In the latter case, the RNC commands a serving BTS to set up a radio link. The RNC then orders the UE from the Idle Mode to CELL_DCH state in RRC Connected Mode by means of an RRC CONNECTION SETUP message. Alternatively, the RNC may order the UE to the cell_FACH state, in which case a radio link between the UE and BTS is not necessary.

Upon receiving the RRC CONNECTION SETUP, the UE performs a physical layer synchronisation procedure (Layer L1) and submits an RRC CONNECTION SETUP COMPLETE message to the RNC. As a result, an RRC connection has been established between the UE/MS and the RNC. The RNC may send a MEASUREMENT CONTROL message to specify handover measurements to be carried out by the UE.

The UE may then send an RRC INITIAL DIRECT TRANSFER message in order to establish a signaling connection. Upon receiving the INITIAL DIRECT TRANSFER message, the RNC routes a Non Access Stratum (NAS) message to the relevant PS-CN. Thereafter, a NAS signaling connection is established between the UE and the PS-CN. Signaling occurs, for example, during the establishment of a GPRS mobility management (MM) context. The PS-CN may then send a RANAP COMMON ID message to the RNC to inform the RNC about the permanent NAS UE identity for a user. The PS-CN may then send a RANAP SECURITY MODE COMMAND to the RNC to trigger the integrity and ciphering functions over the radio interface. The RNC may then send an RRC SECURITY MODE COMMAND message to the UE to start or reconfigure ciphering and/or integrity protection parameters. An RRC SECURITY MODE COMPLETE message is sent by the UE to confirm the reconfiguration of ciphering and/or integrity protection. The RNC then sends an RANAP SECURITY MODE COMPLETE message as a successful response to the RANAP SECURITY MODE COMMAND message.

The above operation in its entirety is basically in accordance with the 3GPP specifications.

There are various methods for activating and releasing access bearer resourses (e.g. radio connections) during a real-time media session, e.g. the PoC service. As will be described in more detail below, according to some embodiments of the invention, in $3^{rd}$ generation mobile communication networks (e.g. in WCDMA networks) a potentially useful method is to keep the terminals in the RRC connected mode during the PoC call but to shift them to a common channel (cell_FACH, cell_PCH or URA_PCH) state during voice inactivity. When someone starts to talk, s/he presses the tangent and her/his terminal starts the transmission. Via normal packet call reservation mechanisms, this shifts the terminals to cell_DCH state with a Dedicated Channel (DCH) for speech transmission so that duplex communication between the parties is possible. When the talking stops (none of the terminals is transmitting any more), the terminals release the DCHs and move back to a common channel state. A state transition from a common channel state to cell_DCH state takes a few hundred milliseconds, which is to be fast enough for smooth operation of the PoC service.

However, this new bearer control approach is problematic to the radio access network RAN, because the established call or session requires a real-time, i.e. streaming or conversational, radio access bearer, which does not use or even tolerate toggling between the CELL_DCH or CELL_FACH states in the prior art systems.

More particularly, the problem is that the RNC may not know which Radio Access Bearer (RAB) is used for a real-time service, e.g. PoC service, that could utilize the state transitions between cell_DCH and common channel states. During active speech sessions, PoC requires a real-time connection having the characteristics of the streaming or (preferably) conversational traffic class RAB. On the other hand, during voice inactivity the real-time connection has to be freed and the transition time from voice inactivity to voice activity does not need to fulfill the strict delay requirements of the real-time data transmission, which is not a preferred operation of the conventional real-time services.

In order to support real-time media services, such as the PoC, that have strict delay requirements during active periods and less strict delay requirements during inactive periods in wireless access networks, such as the WCDMA RAN access network, the call setup signaling between the user terminal, e.g. the UE, and a mobile network is extended so that a core network can recognize a packet connection (e.g. PDP context) belonging to the PoC or corresponding real-time service, and the core network assigns to the access network (e.g. the RAN) a real-time access bearer (e.g. a radio access bearer RAB), which can be shifted to common channel states during voice inactivity. In an embodiment of the invention, distinguishing real-time access bearers (e.g. RABs) that can and cannot be shifted to common channel states can be made by adding a new information element to or extending the range of an existing information element in the Access Bearer Assignment message transmitted from the core network to the access network (e.g. the RAN).

Referring again to the example illustrated in FIG. 4, the PS-CN submits an RAB ASSIGNMENT REQUEST message to the RNC to request the establishment of one or more RABs for the same UE. In accordance with one aspect of the invention, in order to distinguish between real-time access bearers (e.g. RABs) those which can and those which cannot be shifted to common channel states can be made by adding a new information element to or extending the range of an existing information element in this Radio Access Bearer Assignment message.

In an embodiment of the invention, one of the RAB parameters or other parameters within the RAB parameters is employed for this purpose. A traffic class parameter may indicate that the type of the RAB is conversational, streaming, etc. The indication according to the invention may be made in the Source Statistics Descriptor parameter that normally specifies characteristics of the source of submitted data packets. One or more new IE types may be defined for this parameter, indicating that the radio access bearer is of an always-on speech call, e.g. PoC. The new types may be named as always-on speech and always-on unknown so that the real-time RAB according to the invention can be distinguished from the normal types named speech, unknown, etc.

As another example, the current delay parameters could be used to show whether a DCH release is possible or not. If current parameters are used, indicated transfer delay is applicable also to the state transitions, i.e. state transitions are not violating RAB requirements if a transfer delay can be maintained also during a state transition back to the DCH. In practice it would be impossible to always keep the transfer delay for the RAB if also a state transition is required, thus a separate parameter (such as the always-on speech type in the Source Statistics Descriptor parameter) for the purpose of the invention is preferable.

A GTP (GPRS Tunnelling Protocol) tunnel setup may occur between the RNC and the PS-CN in a normal way. However, upon receiving the RAB ASSIGNMENT REQUEST message indicating that the specific RAB can be switched to common channel states, the RNC may not allocate a DCH for the RAB but only the radio bearer is set up. To that end, the RNC sends a RADIO BEARER SETUP message to the UE, and the UE acknowledges with a RADIO BEARER SETUP COMPLETE message. The RNC sends an RAB ASSIGNMENT RESPONSE message to the PS-CN.

The RNC may send a MEASUREMENT CONTROL message to specify traffic volume measurements, which can be used for assisting a dynamic radio bearer control. Quantities that the UE may be configured to report can be triggered using two different mechanisms, periodical and event triggered. The reporting criteria specified in the measurement control message may include one or more of Buffer Occupancy, Average of Buffer Occupancy, and Variance of Buffer Occupancy. The UE performs measurements and transmits measurement reports according to the measurement control information. For the uplink data transmission, the UE reports the observed traffic volume to the network in order for the network to re-evaluate the current allocation of resources. This report contains e.g. the amount of data to be transmitted or the buffer status in the UE.

The UE is now in the CELL_DCH state. The signaling radio bearer (SRB) has a dedicated channel DCH but the real-time radio bearer (the "PoC Bearer") does not have a DCH.

Figure 5:
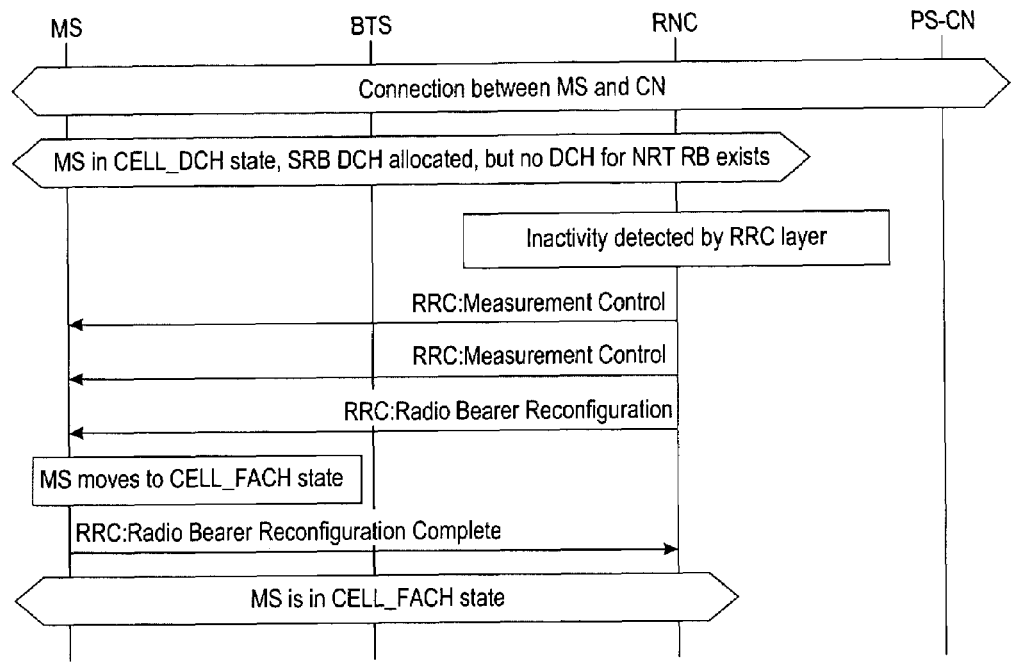
FIG. 5 is a signaling diagram illustrating an example of an initial state transition from a dedicated channel state to a common channel state when no dedicated channel has yet been allocated to a real-time service.

Referring to FIG. 5, let us now consider a case where a transition from a dedicated channel state to a common channel state, e.g. from the CELL_DCH state to the CELL_FACH state, occurs while no DCH has been allocated to the PoC yet (the situation at the bottom of FIG. 4).

The traffic volume or the buffer status depends on the activity of higher layer functions in the UE. For example, in the PoC service, the operation of a speech codec in the UE may be such that when a voice activity detector (VAD) indicates silence (and/or the user does not press the tangent), the speech codec does not provide any data to the access network (e.g. to the RLC buffer) in the UE, not even silence indicator frames, which are generated during a conventional voice supporting the discontinuous transmission (DTX).

Let us now assume that the inactivity detection function of the RAN (e.g. the RNC) detects on the basis of traffic volume control, and/or by some other means (e.g. traffic measurement, RLC buffers, timers, etc. at the RNC) that there is traffic inactivity in the RLC layer in the uplink direction, or in a duplex communication, in both directions. Because of the detected inactivity, the UE is shifted to a common channel state, typically first to the CELL_FACH state and further to the CELL_PCH state. There may be further MEASUREMENT CONTROL messages sent to the UE. The RNC commands the UE to the CELL_FACH state with the RADIO BEARER RECONFIGURATION message. The UE shifts to the CELL_FACH state and acknowledges with the BEARER RECONFIGURATION COMPLETE message.

Most of the time, both (all) terminals UE participating in a PoC call are in a common channel state, CELL_FACH, CELL_PCH or URA_PCH because of the silence of the respective subscribers.

Figure 6:
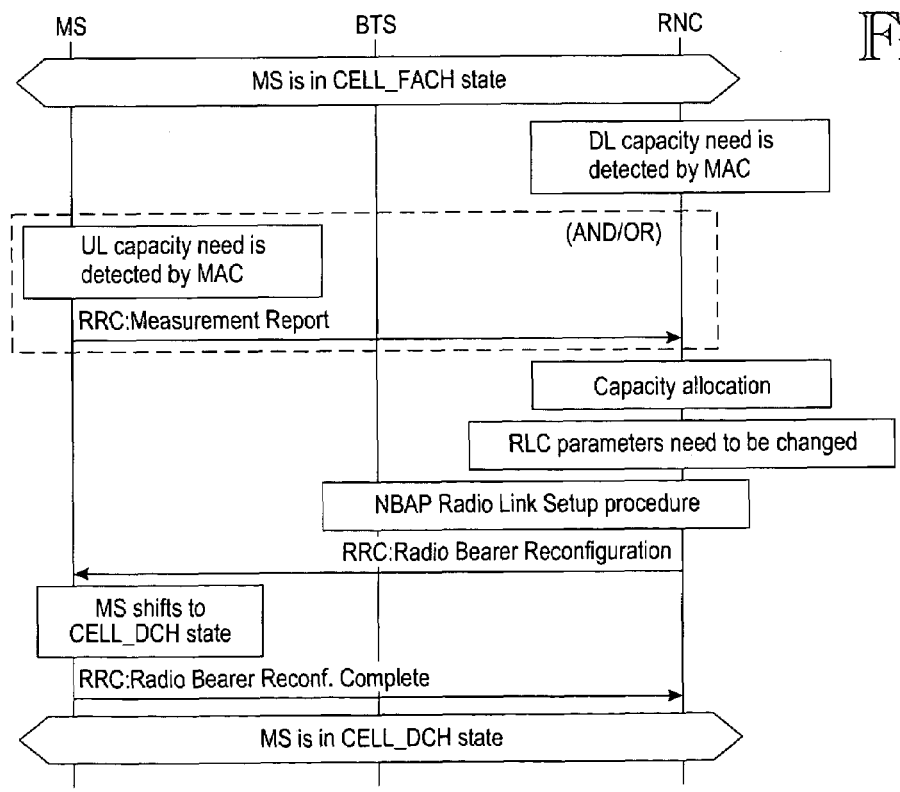
FIG. 6 is a signaling diagram illustrating an example of a state transition from a common channel state to a dedicated channel state.

Referring to FIG. 6, let us now consider an example of a transition from a common channel state to a dedicated channel state, e.g. from the CELL_FACH state to the CELL_DCH state. The initial situation may be similar to that at the bottom of FIG. 5.

When the user of the UE wants to say something to the other participant(s) in the PoC call, s/he presses the tangent in the UE. The tangent button activates a speech codec regardless of the voice activity, and the speech codec starts to generate data into the RLC buffer in the UE. Because the UE is in a common channel state (CELL_FACH), it sends a capacity request (e.g. an RRC MEASUREMENT REPORT message) to the RNC, which activates the transition to CELL_DCH state. Similarly, the RNC may detect a capacity need in the downlink direction and activate the transition to CELL_DCH state itself. The RNC allocates the required capacity (including a DCH for the real-time RAB), detects a need to change the RLC parameters, carries out the radio link setup procedure with the base station BS, and commands the UE to the CELL_DCH state with the RADIO BEARER RECONFIGURATION message. The UE shifts into the CELL_DCH state and acknowledges with an RADIO BEARER RECONFIGURATION COMPLETE message. As soon as the radio link has been synchronized, the transmission is started from the UE (called subscriber A herein) towards the recipient(s) (called subscriber B herein).

Let us assume that also subscriber B is user equipment controlled by the same (or another) RNC. The data from subscriber A first arrives at the subscriber B's RLC buffer in the RNC. Because subscriber B is also in a common channel state, its RNC first activates the transition to CELL_DCH state (the downlink activity detection described above). As soon as the radio link has been set up and synchronized (in a similar manner to that described above for subscriber A), a full duplex real-time speech connection between subscribers A and B exists. Because the two sequential state transitions may take approximately 1 to 2 seconds, subscriber A's terminal may, in an embodiment of the invention, give an indication (such as a beep tone) a couple of seconds after pressing the tangent button in order to indicate to subscriber A that s/he can start talking because both subscribers have most probably shifted to CELL_DCH state (even if subscriber A's terminal receives no explicit indication about the state transition of subscriber B's terminal). Next the subscribers are capable of discussing in a manner similar to a conventional speech call.

In the above example duplex communication has been set up. Conventionally, a typical PoC service takes place in a semiduplex mode. Semiduplex communication can be used also in association with the present invention. In the context of the above examples, the semiduplex operation would refer to allocating unidirectional resources in the RAN, i.e. allocating the uplink resources only when voice activity on the uplink is detected, achieved capacity savings in the radio interface are considered minor. Added complexity and signaling load in the RAN would be significant. In addition, if duplex resources are not allocated, an allocation delay and possibility of lacking resources at the time of allocation are applicable every time someone starts talking. Thus, the potential enhancement in spectrum efficiency when trying to utilize the semiduplex character of typical PoC communication would require some "ideal" (e.g. very fast response times) behaviour in radio resource allocations. Taking into account the realistic limitations of the WCDMA protocols, for example, the duplex approach will be faster and more user-friendly, which makes this loss in spectrum efficiency due to the duplex operation acceptable.

In the example described above, the state transitions to the CELL_DCH state occur sequentially: first subscriber A is shifted to the CELL_DCH state, and after completion of this transition the data received from subscriber A triggers the state transition of subscriber B. In an embodiment of the invention, the total time needed for both state transitions is shortened by configuring the RNC of subscriber A to send a dummy data packet to subscriber B as soon as the RNC has received the capacity request from subscriber A's terminal. In this case, the state transitions of both subscribers occur at the same time, which further shortens the time between pressing the tangent and activating the speech connection.

Referring to FIG. 7, let us now consider an example of a transition from a dedicated channel state to a common channel state (e.g. from the CELL_DCH state to the CELL_FACH state) after an inactivity detection when there is a DCH allocated for the real-time RAB (i.e. the PoC). The initial situation may be similar to that at the bottom of FIG. 6.

When subscribers A and B have stopped talking, the VAD of both terminals UE indicates silence and no data is conveyed to their RLC buffers in the terminals. Further, no data is conveyed to their RLC buffers in the RNC(s). For the smooth operation of the PoC service, it is preferable that there is a relatively long timer to indicate the inactivity in the VAD. For example, the speech codec may stop providing data or silence indicator frames to the access network (e.g. to the RLC buffer) in the UE only after a predetermined inactivity timer has expired. In addition or alternative to the former timer, there may be a timer for controlling the time of sending an RRC measurement report to the RNC after the RLC buffer has become empty. The timer(s) enable(s) annoying breaks to be avoided in the background noise during the conversation and state transitions to be prevented during pauses between sentences.

Upon detecting the inactivity in both directions, the RNC shifts both terminals UE to a common channel state, typically first to CELL_FACH state and further to CELL_PCH state. The input for the decision making in the RNC can be e.g. to measure its RLC buffers or to receive a traffic volume measurement to indicate an empty UE RLC buffer. It is also preferable that the RNC is provided with the transition timer(s) controlling the transition from CELL_DCH to a common channel state. The timer(s) in the RNC is/are set to be long enough to prevent too frequent state transitions.

The RNC observes that the RLC parameters have to be changed, and commands the UE to the CELL_FACH state with an RADIO BEARER RECONFIGURATION message. The UE moves to the CELL_FACH state and acknowledges with a RADIO BEARER RECONFIGURATION COMPLETE message. In the case the UE chooses a cell different from that assigned by the RNC, an RRC cell update procedure may be carried out before the transition. Upon receiving the RADIO BEARER RECONFIGURATION COMPLETE message, the RNC releases the radio resources (releases the DCH) and carries out a radio link deletion procedure with the BTS.

As an alternative to the above described concept, there are also other methods for activating and releasing the radio connections during a real-time service, such as the PoC service. The most straightforward way is to totally release the connection to the network during media (e.g. voice) inactivity. The knowledge of the active real-time service (e.g. a PoC service) then only resides in the terminals of the calling parties. When someone needs to talk, s/he presses the tangent button and her/his terminal places a call to all parties. The terminals of the other parties recognize the incoming call as an activation of the existing real-time (e.g. a PoC) connection and activate the call automatically without the need to press the answer key. The major drawback of this alternative method is that it is all too slow for the smooth operation of the real-time services like the PoC.

Another alternative is to release the RRC connection in the Radio Access Network (RAN) during the voice inactivity but maintain the connection in the core network by leaving the PDP context active. This allows faster activation of the radio connection than with the abovementioned method but because setting up the RRC connection to RAN may still take several seconds, also this method is too slow for the PoC service.

Various embodiments of the invention have been described, but it will be appreciated by persons skilled in the art that these embodiments are merely illustrative and that many other embodiments are possible. The intended scope of the invention is set forth in the following claims rather than in the preceding description, and all variations that fall within the scope and spirit of the claims are intended to be embraced therein.

The invention claimed is:

1. An apparatus, comprising:
   an establishing unit configured to establish a real-time media session between user equipment and a second party via an access network and a packet switched core network based on an information element in a radio access bearer assignment message received from the core network to the access network, said information element indicating that the real-time media session requires a real-time access bearer of a type that can be shifted between a dedicated channel state and a common channel state;
   a moving unit configured to move a real-time access bearer assigned to the real-time media session between a dedicated channel state and a common channel state under control of the access network;
   an uplink connection buffer;
   a monitoring unit configured to monitor a status of the uplink connection buffer;
   an indicating unit configured to indicate the status of the uplink connection buffer to the radio access network at least during the dedicated channel state; and
   a sending unit configured to send a capacity request to the radio access network when there is data in the uplink communication buffer during the common channel state, to cause a transition to the dedicated channel state.

2. The apparatus of claim 1, further comprising:
   a voice activity detector;
   a push-to-talk switch; and
   a speech coder that provides data to the uplink connection buffer when the push-to-talk switch is activated, wherein said speech coder is configured to cease to provide data to the uplink connection buffer when the push-to-talk switch is activated and the voice activity detector detects a silent period of at least a predetermined duration.

3. The apparatus of claim 2, further comprising:
   at least one timer measuring the predetermined duration.

4. The apparatus of claim 1, wherein the real-time access bearer comprises at least one radio access bearer of one of a streaming and a conversational type.

5. The apparatus of claim 1, wherein the real-time media service is one of a push-to-talk over a cellular and a corresponding packet-mode voice communication service of a client-server type, and wherein the apparatus further comprises a packet-mode voice communication client.

6. The apparatus of claim 1, wherein the packet-mode voice communication client comprises a push-to-talk over cellular client.

7. The apparatus of claim 1, wherein the apparatus is configured for a radio access network of a wideband code division multiple access type.

8. An apparatus, comprising:
   a receiver configured to receive from a packet switched core network an access bearer assignment message requesting an access network to assign a radio access bearer for a real-time media session that is being established between user equipment and a second party via the access network and the packet switched core network, said access bearer assignment message including an information element indicating that the real-time media session requires a real-time access bearer that can be shifted between a dedicated channel state and a common channel state; and
   a processor configured to assign to the real-time media session a real-time access bearer that can be shifted between a dedicated channel state and a common channel state, to monitor media activity of the real-time access bearer, to shift the access bearer to the common channel state upon detecting media inactivity during the dedicated channel state;
   and to shift the access bearer to the dedicated channel state upon detecting the media activity during the common channel state.

9. The apparatus of claim 8, wherein the processor is further configured to:
   detect at least one of the activity or the inactivity of the real-time access bearer based on at least one of: a status of an uplink connection buffer in the user equipment, a status of one of an uplink and a downlink connection buffer in the access network, a status of one of an uplink and a downlink connection buffer of the second party in the access network, traffic volume related signaling received from one of the user equipment and the second party and a capacity request from the user equipment.

10. The apparatus of claim 9, further comprising:
    a transmitter configured to send dummy data from the radio access network towards the second party upon initiating a transition of the real-time bearer from the common channel state to the dedicated channel state and before receiving data from the user equipment, to advance a state transition of a connection leg of the second party.

11. The apparatus of claim 8, further comprising:
    at least one timer configured to control one of the inactivity detection and the transition from the dedicated channel state to the common channel state.

12. The apparatus of claim 8, wherein the access network comprises a radio access network, and the real-time access bearer comprises a real-time radio access bearer.

13. The apparatus of claim 8, wherein the real-time media service is one of a push-to-talk over a cellular and a corresponding packet mode-voice communication service of a client-server type.

14. The apparatus of claim 8, wherein the real-time access bearer comprises at least one radio access bearer of one of a streaming and a conversational type.

15. The apparatus of claim 8, wherein the access network comprises a radio access network of a wideband code division multiple access type.

16. A method, comprising:
establishing a real-time media session between user equipment and a second party via an access network and a packet switched core network based on an information element in a radio access bearer assignment message received from the core network to the access network, said information element indicating that the real-time media session requires a real-time access bearer of a type that can be shifted between a dedicated channel state and a common channel state;
moving a real-time access bearer assigned to the real-time media session between a dedicated channel state and a common channel state under control of the access network;
buffering an uplink connection;
monitoring a status of the uplink connection buffer;
indicating the status of the uplink connection buffer to the access network at least during the dedicated channel state; and
sending a capacity request to the access network when there is data in the uplink communication buffer during the common channel state, to cause a transition to the dedicated channel state,
wherein the method is performed by a processor.

17. The method of claim 16, further comprising:
providing data to the uplink connection buffer when a push-to-talk switch is activated;
ceasing to provide data to the uplink connection buffer when the push-to-talk switch is activated and a voice activity detector detects a silent period of at least a predetermined duration.

18. The method of claim 17, further comprising:
measuring the predetermined duration.

19. The method of claim 16, wherein the real-time access bearer comprises at least one radio access bearer of one of a streaming and a conversational type.

20. The method of claim 16, wherein the real-time media service is one of a push-to-talk over a cellular and a corresponding packet-mode voice communication service of a client-server type.

21. The method of claim 16, wherein the packet-mode voice communication client comprises a push-to-talk over cellular client.

22. A method, comprising:
receiving, by a receiver, from a core network an access bearer assignment message requesting to assign a radio access bearer in an access network for a real-time media session that is being established between user equipment and a second party via the access network and the core network, said message containing an information element indicating that the real-time media session requires a real-time access bearer of a type that can be shifted between a dedicated channel state and a common channel state;
assigning, by a processor, to the real-time media session a real-time access bearer of a type that can be shifted between a dedicated channel state and a common channel state;
monitoring media activity of the real-time access bearer;
shifting the access bearer to the common channel state upon detecting media inactivity during the dedicated channel state; and
shifting the access bearer to the dedicated channel state upon detecting the media activity during the common channel state.

23. The method of claim 22, further comprising:
detecting at least one of the activity or the inactivity of the real-time access bearer based on at least one of: a status of an uplink connection buffer in the user equipment, a status of one of an uplink and a downlink connection buffer in the access network, a status of one of an uplink and a downlink connection buffer of the second party in the access network, traffic volume related signaling received from one of the user equipment and the second party and a capacity request from the user equipment.

24. The method of claim 23, further comprising:
sending dummy data from the radio access network towards the second party upon initiating a transition of the real-time bearer from the common channel state to the dedicated channel state and before receiving data from the user equipment, to advance a state transition of a connection leg of the second party.

25. The method of claim 22, further comprising:
controlling one of the inactivity detection and the transition from the dedicated channel state to the common channel state.

26. The method of claim 22, wherein said access bearer assignment message is received from the core network and comprises an information element indicating a type of the required real-time access bearer.

27. The method of claim 22, wherein the access network comprises a radio access network, and the real-time access bearer comprises a real-time radio access bearer.

28. The method of claim 22, wherein the real-time media service is one of a push-to-talk over a cellular and a corresponding packet mode-voice communication service of a client-server type.

29. The method of claim 22, wherein the real-time access bearer comprises at least one radio access bearer of one of a streaming and a conversational type.

30. The method of claim 22, wherein the access network comprises a radio access network of a wideband code division multiple access type.

* * * * *